(12) United States Patent
Anthoine-Milhomme

(10) Patent No.: US 10,830,271 B2
(45) Date of Patent: Nov. 10, 2020

(54) SENSOR FOR MEASURING A TIGHTENING FORCE APPLIED ON A SCREW-ASSEMBLY MEMBER

(71) Applicant: Centre Technique des Industries Mécaniques, Senlis (FR)

(72) Inventor: Didier Anthoine-Milhomme, Albens (FR)

(73) Assignee: CENTRE TECHNIQUE DES INDUSTRIES MECANIQUES (FR)

( * ) Notice: Subject to any disclaimer, the term of this patent is extended or adjusted under 35 U.S.C. 154(b) by 0 days.

(21) Appl. No.: 16/301,491

(22) PCT Filed: May 26, 2017

(86) PCT No.: PCT/FR2017/051317
§ 371 (c)(1),
(2) Date: Nov. 14, 2018

(87) PCT Pub. No.: WO2017/203188
PCT Pub. Date: Nov. 30, 2017

(65) Prior Publication Data
US 2019/0195263 A1    Jun. 27, 2019

(30) Foreign Application Priority Data
May 26, 2016   (FR) ..................................... 16 54719

(51) Int. Cl.
*G01L 5/00* (2006.01)
*F16B 31/02* (2006.01)
(Continued)

(52) U.S. Cl.
CPC ............ *F16B 31/028* (2013.01); *G01L 5/161* (2013.01); *G01L 5/243* (2013.01)

(58) Field of Classification Search
CPC ......... G01L 5/161; G01L 5/243; F16B 31/028
(Continued)

(56) References Cited

U.S. PATENT DOCUMENTS 3,974,685 A * 8/1976 Walker ................ B25B 23/1456
73/761
4,322,193 A * 3/1982 Stahl ...................... E21D 21/02
29/407.02
(Continued)

FOREIGN PATENT DOCUMENTS

FR    3 025 883 A3    3/2016
JP    2006-162394 A   6/2006

OTHER PUBLICATIONS

International Search Report dated Sep. 11, 2017 in corresponding PCT International Application No. PCT/FR2017/051317.
(Continued)

*Primary Examiner* — Max H Noori
(74) *Attorney, Agent, or Firm* — Ostrolenk Faber LLP

(57) ABSTRACT

A sensor (1) for measuring a tightening force applied on a screw-assembly member (2). The measurement sensor includes a ring and an electronic device comprising a longitudinal support strip having two opposite ends. The support strip is installed on a flat surface of the ring. The electronic device (26) includes a first circuit capable of generating a signal representative of a tightening force applied in a tightening direction on one of the two opposing faces; a second circuit capable of generating a signal representative of the distance of the applied force from the center of the ring in a first direction perpendicular to the tightening direction; and a third circuit capable of generating another signal representative of the distance of the applied force from the center of the ring in a second direction perpendicular to the tightening direction.

11 Claims, 2 Drawing Sheets

(51) Int. Cl.
*G01L 5/24* (2006.01)
*G01L 5/161* (2020.01)

(58) Field of Classification Search
USPC .......................................................... 73/761
See application file for complete search history.

(56) References Cited

U.S. PATENT DOCUMENTS

| | | | | |
|---|---|---|---|---|
| 6,250,863 | B1 | 6/2001 | Kamentser et al. ............. | 411/10 |
| 10,317,303 | B2* | 6/2019 | Spirer ................... | G01L 25/003 |
| 2003/0039527 | A1* | 2/2003 | Schatz ..................... | F16B 31/02 |
| | | | | 411/9 |
| 2010/0116101 | A1* | 5/2010 | Dral ....................... | B23P 19/066 |
| | | | | 81/467 |
| 2016/0265575 | A1* | 9/2016 | Kolb ........................ | F16B 31/02 |
| 2019/0120275 | A1* | 4/2019 | Junkers ................... | B25B 21/00 |

OTHER PUBLICATIONS

Written Opinion dated Sep. 11, 2017 in corresponding PCT International Application No. PCT/FR2017/051317.

* cited by examiner

SENSOR FOR MEASURING A TIGHTENING FORCE APPLIED ON A SCREW-ASSEMBLY MEMBER

CROSS-REFERENCE TO RELATED APPLICATIONS

The present application is a 35 U.S.C. §§ 371 national phase conversion of PCT/FR2017/051317, filed May 26, 2017, which claims priority of French Patent Application No. 1654719, filed May 26, 2016, the contents of which are incorporated by reference herein. The PCT International Application was published in the French language.

BACKGROUND OF THE INVENTION

The present invention relates to a sensor for measuring a tightening force applied on a screw-assembly member.

Particularly in the railway field, the importance of fixing railway fishplates requires precision control of the tightening forces applied during the fixing thereof to a pair of rails.

When it is desired to know the intensity of a tightening force applied by a power tool, for example an electric screwing device, on a screw assembly, it is known practice to use tightening force sensors.

These force sensors, also referred to as load cells, are installed in such a way as to be compressed during tightening, for example between a nut screwed on a threaded rod against a fishplate so as to fix the fishplate to a rail.

The force sensors comprise strain gauges detecting the deformation of the sensor and measuring the intensity of an electrical signal produced by the deformation of the gauge, making it possible to deduce therefrom the intensity of the tightening force.

However, the point of application of the tightening force on the ring is not always in the main tightening axis, in particular in the main axis of screwing for screw assemblies. This point of application is able to vary as a function in particular of the power tools employed and of the arrangement of the assembly to be tightened.

The sensors known in the prior art, which make it possible to detect the distancing of the point of application of the tightening force from the main tightening axis, impose the installation of strain gauges on flexible supports hugging the curvature of the ring. However, this type of solution is associated with a relatively high manufacturing cost and with a relatively large electricity consumption.

SUMMARY OF THE INVENTION

Consequently, there exists need for a sensor for measuring a tightening force, making it possible to measure the tightening force applied by a tightening tool to a screw-assembly member while detecting the distancing of the point of application of the tightening force from the main tightening axis, and which has a relatively low manufacturing cost and allows its energy consumption to be optimized.

A sensor is proposed for measuring a tightening force applied to a screw-assembly member, comprising a ring having at least two faces axially opposite one another and a planar surface perpendicular to said two opposite faces.

The sensor comprises an electronic device comprising a longitudinal support strip having two opposite ends. The support strip is installed on the planar surface.

The electronic device comprises three circuits mounted on the longitudinal support strip:

a first circuit is able to generate a signal representative of a tightening force applied in a tightening direction to one of the two opposite faces;

a second circuit is able to generate a signal representative of the distance of the applied force with respect to the center of the ring in a first direction perpendicular to said tightening direction; and a third circuit is able to generate another signal representative of the distance of the applied force with respect to the center of the ring in a second direction perpendicular to the tightening direction.

Thus, it is possible to measure a tightening force applied by a power tool, for example a screwing device, to a screw-assembly member, by simultaneously measuring the tightening intensity applied in the main screwing axis, but also the distancing of the tightening force along two axes perpendicular to the main screwing axis, so as to be able to refine the measured value of the tightening force. This solution thus makes it possible to obtain all these measurements by installing the strain gauges on a planar and rigid support. Such a solution thus makes it possible to reduce the manufacturing costs of the sensor and improves its electrical consumption.

Advantageously, and in a nonlimiting manner, the first circuit comprises a full-bridge assembly of strain gauges. Thus, the tightening force in the main tightening axis can be determined in a relatively reliable and inexpensive manner.

Advantageously, and in a nonlimiting manner, the full-bridge assembly comprises two first strain gauges each installed on an opposite end of the support strip, and two other first strain gauges each installed in the vicinity of the center of the support strip and spaced from the center, such that one of the other first strain gauges is symmetrical to the other one with respect to the center of the support strip. In this way, the quality of the measurement of the tightening force in the main tightening axis is optimized.

Advantageously, and in a nonlimiting manner, the second circuit and/or the third circuit comprise/comprises a half-bridge assembly of strain gauges. Thus, it is possible to determine at least one direction of distancing, also referred to as direction of offsetting, of the point of application of the tightening force on the ring with respect to the main tightening axis.

Advantageously, and in a nonlimiting manner, the half-bridge assembly of strain gauges of the second circuit comprises a first strain gauge of the second circuit installed on an end of the support strip and a second strain gauge of the second circuit installed in the vicinity of the center and distant from the center in the tightening direction. In this way, the quality of the measurement of the distancing of the tightening force by the second circuit is optimized.

Advantageously, and in a nonlimiting manner, the second gauge of the second circuit is distant with respect to the center of the support strip in the tightening direction such that the second gauge of the second circuit is moved closer in the direction of the face of the ring to which the tightening force is applied. In this way, the quality of the measurement of the distancing of the point of application of the tightening force on the ring by the second circuit is optimized.

Advantageously, and in a nonlimiting manner, the half-bridge assembly of gauges of the third circuit comprises a first gauge of the second circuit installed on an end of the support strip and a second gauge of the third circuit installed in the vicinity of the center and distant from the center of the support strip in the first direction perpendicular to the tightening direction. In this way, the quality of the measurement of distancing of the point of application of the tightening force on the ring by the third circuit is optimized.

Advantageously, and in a nonlimiting manner, the first gauge of the half-bridge assembly of gauges of the second circuit is installed on an opposite edge of the support strip to the first gauge of the half-bridge assembly of gauges of the third circuit. Thus, the distribution of the gauges on the support strip is optimized, thereby improving the measurements, since it is then possible to determine more finely the deformations of the ring of the sensor.

In one particular embodiment, the first direction corresponds to the longitudinal direction of the support strip. This first direction can be defined in particular with respect to the direction most probably associated with an offsetting of the tightening force, for example in the case of the tightening of a fishplate on a railway rail installed horizontally, vertically or in the direction of the length of the rail.

Advantageously, the second direction extends along an axis forming a base ortho-normal with an axis in which the first direction extends and with an axis in which the main tightening direction extends. Thus, it is possible to measure the offsetting of a tightening force in two directions perpendicular to the main tightening axis, along two axes, in particular forming a base ortho-normal with the main tightening axis, thereby making it possible to detect all the possible offsettings of the tightening force with respect to the tightening direction.

The invention also relates to a method for measuring a tightening force applied against a face of a sensor as described above during the tightening of a screw-assembly member passing through the opening of the sensor, comprising a calibration step during which a plurality of forces are successively applied to at least one of the two parallel faces of the sensor, and during which the signals generated by the first circuit, the second circuit and the third circuit are measured so as to determine parameters making it possible to estimate the values of the forces applied against the face of the sensor and the distance of these forces with respect to the center of the opening of the sensor, and a step of measuring the applied tightening force as a function of the signals generated by the three circuits and of the parameters determined during the calibration step.

Other particular features and advantages of the invention will emerge on reading the following description of a particular embodiment of the invention given by way of nonlimiting indication with reference to the appended drawings, in which:

DESCRIPTION OF AN EMBODIMENT

Figure 1:
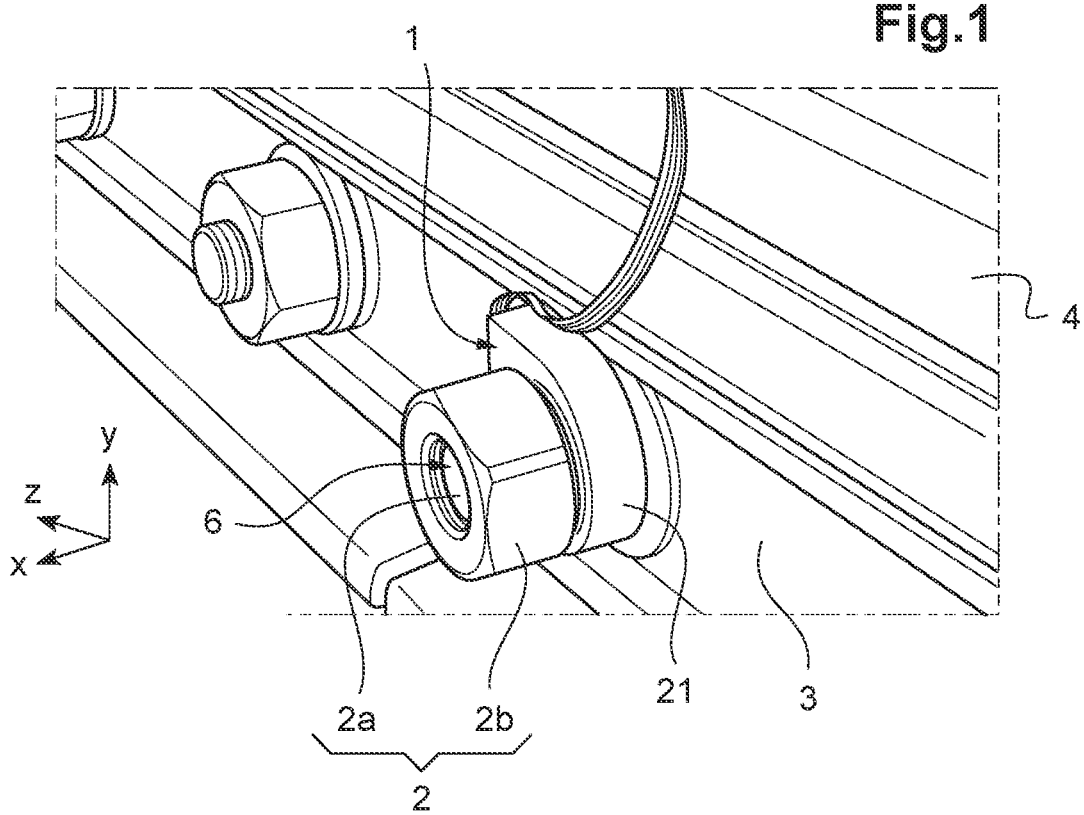
FIG. 1 is a perspective view of a fishplate mounted on the edge of a railway rail and of a force sensor according to one embodiment of the invention that is installed to measure a tightening force of a nut intended to fix the fishplate on the rail.
Figure 2:
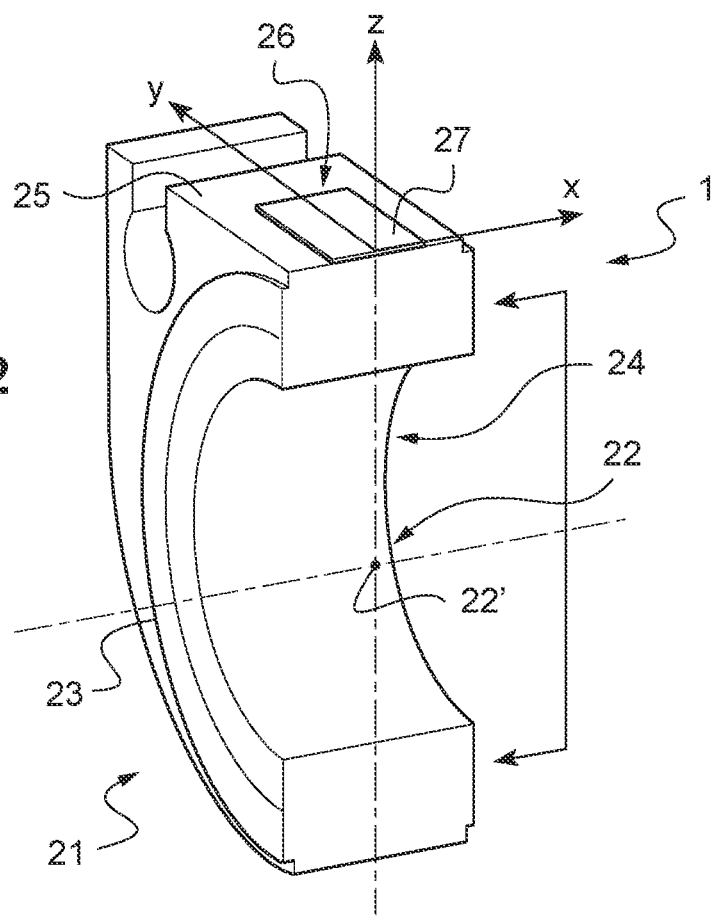
FIG. 2 is a cross section of a sensor according to the embodiment of FIG. 1.
Figure 3:
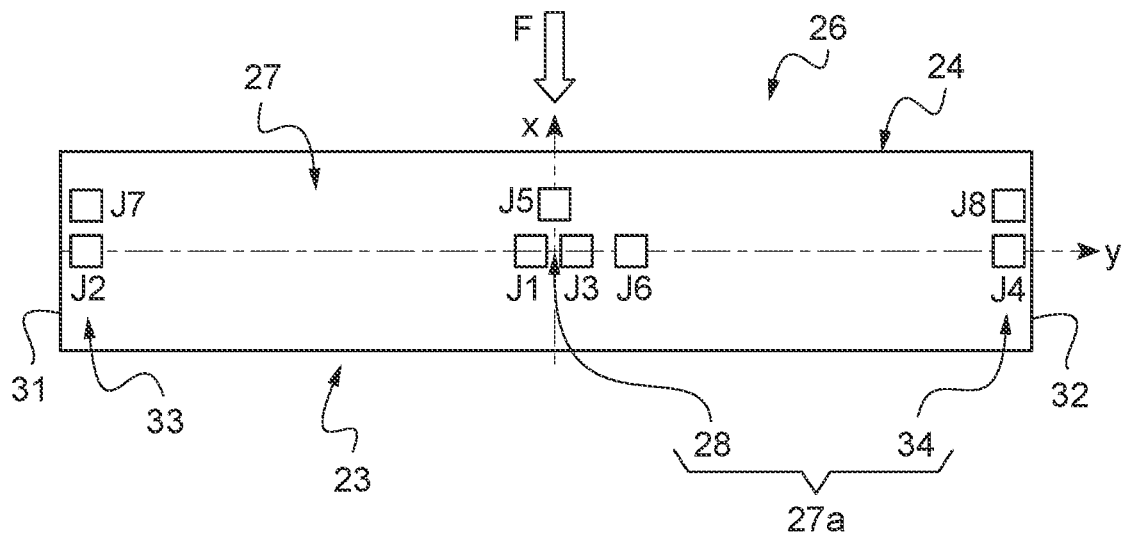
FIG. 3 is a top view of a planar face of the ring on which there is installed the electronic device of a sensor according to the embodiment of the invention of FIG. 1.

FIGS. 1 to 4, referring to one and the same embodiment, will be discussed simultaneously.

A sensor 1 makes it possible to measure a tightening force applied to a screw-assembly member 2.

Here, the screw-assembly member 2 comprises a threaded rod 2a on which a nut 2b is screwed.

In this embodiment, the threaded rod 2a is coupled to a railway rail 4. For example, a nut (not shown) is screwed onto a free end of the threaded rod 2a so as to be able to retain the threaded rod in abutment against the rail 4 while another nut 2b is being tightened at another free end.

The threaded rod 2a passes through a fishplate 3 installed against an edge of the rail 4 and receives at the other free end 6 a nut 2b in respect of which it is desired to measure a tightening force.

The sensor 1 comprises a ring 21 fitted over the threaded rod 2a and having an orifice 22 of substantially circular shape. In this embodiment the orifice 22 has a diameter of 28 mm, but it can have any diameter allowing it to be traversed by a threaded rod or another screw-assembly member.

The orifice 22 passes through the ring 21 along a main axis X defining the tightening direction of the nut 2b screwed onto the threaded rod 2a against the fishplate 3. In other words, the threaded rod 2a extends along the main axis X, and the tightening direction of the nut 2b is defined by this main axis X. Reference will be made in the remainder of the description to this main axis X as being the main screwing axis X.

The ring 21 is made of a rigid material, for example a metal able to be slightly deformed by compressive forces while being able to resume its initial shape when the compression ceases.

Specifically, the ring 21 is intended to be tightened against the fishplate 3 by the nut 2b when this nut is screwed onto the threaded rod 2a. Thus, the deformations of the ring 21 of the sensor 1 induced by the compression of the nut 2b screwed onto the ring are measured by the sensor 1 in order to determine the tightening force.

The ring 21 has two substantially planar opposite faces 23, 24. The orifice 22 extends through the ring 21 between the two opposite faces 23, 24.

A first face 23 comes into abutment against the fishplate 3, whereas the other face 24 is in contact with the nut 2b which comes to compress the ring 21 against the fishplate 3. Thus, the other face 24 is the face to which the tightening force is applied.

The ring 21 also has an installation face 25 for an electronic device 26.

The installation face 25 is a substantially planar face extending in a plane perpendicular to the two opposite faces 23, 24 over a length which is greater than or equal to the diameter of the orifice 22.

The electronic device 26 comprises a longitudinal support strip 27 fastened to the substantially planar face 25.

The support strip 27 extends on the installation face 25 so as to be arranged in an ortho-radial manner with respect to the orifice 22.

Advantageously, the support strip 27 extends over a length which is greater than or equal to the diameter of the orifice 22.

In particular, the greater the length of the support strip 26, the better the quality of the deformation measurements described hereinbelow.

The electronic device 26 also comprises three circuits 41, 42, 43, mounted fixedly on the support strip 27.

The three circuits 41, 42, 43 are supplied by an electric accumulator (not shown) soldered to a printed circuit, which may for example be installed on the support strip 27.

According to an alternative, the electric accumulator may be a removable battery.

The first circuit 41 is configured to generate a signal representative of a tightening force applied in a tightening direction to one of the two opposite faces 23, 24.

The first circuit 41 comprises a Wheatstone-bridge assembly 41 of four strain gauges J1, J2, J3, J4. In other words, the first circuit 41 comprises four strain gauges J1, J2, J3, J4, assembled together according to a scheme well known to a person skilled in the art, referred to as full Wheatstone-bridge assembly and generally referred to as full-bridge assembly.

The strain gauges J1, J2, J3, J4 of the first full-bridge assembly 41 are paired two by two such that a first pair of gauges J1, J2 is installed symmetrically to the second pair of gauges J3, J4 in the length of the printed circuit with respect to the center 28 of the support strip 27.

The support strip 27 is installed on the installation face 25 such that the center 28 of the support strip 27 substantially corresponds to the point of arrival of an orthogonal projection of the center 22' of the orifice 22 of the ring 21 on the support strip 27.

For each pair of strain gauges J1, J2, J3, J4, a first gauge J1, J3 is installed in the vicinity of the center 28 of the support strip 27, whereas a second gauge J2, J4 is installed on a longitudinal edge 33, 34 of the support strip 27.

Figure 4:
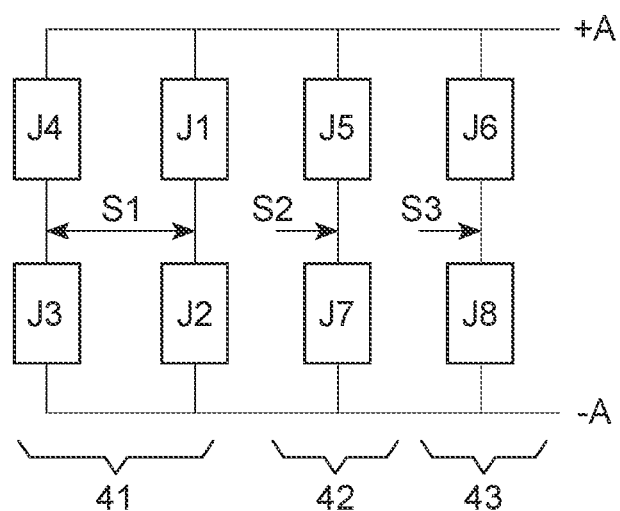
FIG. 4 is an electrical diagram of the electronic device of the sensor according to the embodiment of FIG. 1.

A first voltage S1 is measured at the center of the full bridge, with reference to FIG. 4, representing the variation of the strain gauges J1, J2, J3, J4, making it possible to determine the value of the tightening force applied to one face 24 of the ring 21 from among the opposite faces 23, 24.

The first voltage S1 measured at the center of the full bridge corresponds to the difference in potentials respectively measured at the junction between the gauges J1, J2 and J3, J4 of one and the same pair of strain gauges J1, J2, J3, J4.

The second circuit 42 is able to generate a signal representative of the distancing of the point of application of the tightening force with respect to the center 22' of the ring 21 in a first direction perpendicular to the tightening direction.

Here, the first perpendicular direction extends along an axis Y defining the length in which the longitudinal support strip 27 extends.

The second circuit 42 comprises a Wheatstone half-bridge assembly 42 formed by two strain gauges J5, J7.

A first strain gauge J5 of the second circuit 42 is arranged substantially equidistantly from the two longitudinal ends 31, 32 of the support strip 27 in a position which is substantially offset from the center 28 of the support strip along the main screwing axis X. With two gauges J1, J3 of the first assembly 41 being installed on either side of the center 28 of the support strip 27, it is not readily straightforward in this embodiment to install the first strain gauge J5 of the second circuit 42 at the center 28 of the support strip 27.

Thus, the first strain gauge J5 of the second circuit 42 is moved closer to the face 24 to which the tightening force is applied.

The second strain gauge J7 of the second circuit 42 is installed on one of the longitudinal edges 33, 34 of the support strip 27.

There is then measured a second voltage S2 corresponding to the difference in potentials measured between respectively the junction between the two gauges J5, J7 of the second circuit 42 and a reference potential, preferably invariant or weakly variable, for example taken at a terminal of a gauge J2, J4 installed on an edge 33, 34 of the support strip 27.

Advantageously, the reference potential for the second voltage S2 is taken on a resistor half-bridge, the resistors of which are not active in deformation (not shown).

The variations in the second voltage S2 make it possible to detect the distancing of the tightening force applied to the ring 21 with respect to the axis Y perpendicular to the main axis X of the longitudinal portion forming a plane parallel to the plane of the planar part of the longitudinal portion.

The third circuit 43 is a circuit able to generate another signal representative of the distancing of the tightening force with respect to the center 22' of the circular opening 22 of the ring 21 in a second direction perpendicular to the tightening direction.

Here, the second perpendicular direction extends along the axis Z forming a base ortho-normal with the main tightening axis X and the axis along which the first perpendicular direction Y is directed.

The third circuit 43 comprises a Wheatstone half-bridge assembly 43 formed by two strain gauges J6, J8.

A first strain gauge J6 of the third circuit 43 is arranged on a first half 27a of the support strip so as to be closer to the center 28 of the support strip 27 than to the edge 34. Here, the first gauge J6 is arranged substantially at a distance from the center 28, in the longitudinal direction, of between 5% and 20% of the length of the first half 27a of the support strip 27.

The second strain gauge J8 of the third circuit 43 is for its part installed on an edge 34 of the support strip 27. This edge 34 is different from the edge 33 on which the second gauge J7 of the second circuit 42 is installed. In other words, the second gauge J8 of the third circuit 43 is at the opposite end to the second gauge J7 of the second circuit in the lengthwise direction of the support strip 27.

There is then measured a third voltage S3 corresponding to the difference in potentials measured between respectively the junction between the two gauges J6, J8 of the third circuit 43 and a reference potential, preferably invariant or weakly variable, for example taken at a terminal of a gauge J2, J4 installed on an edge 33, 34 of the support strip 27.

Advantageously, the reference potential for the third voltage S3 is taken on a resistor half-bridge, the resistors of which are not active in deformation (not shown).

The variations in the third voltage S3 make it possible to detect the distancing of the tightening force with respect to the center 22' of the orifice 22 of the ring 21 in the second perpendicular direction Z.

The sensor 1 additionally comprises a member (not shown) able to implement a method for measuring a tightening force applied against a face of the sensor when tightening the screwed assembly member 2 passing through the orifice 22 of the sensor 1.

This member comprises a microprocessor, a memory and inputs-outputs able to communicate with the three circuits 41, 42, 43 of the force sensor 1. However, the member for implementing the method according to the invention is not limited to this form and can be constituted by any suitable element known to a person skilled in the art.

The method for measuring a tightening force comprises a calibration step during which there are successively applied a plurality of predetermined tightening forces, offset in the first and the second perpendicular direction, or in other words along the axes Y and Z forming a base ortho-normal with the axis X along which the tightening direction extends and, where appropriate, also applying a non-offset tightening force.

These offset and non-offset forces are applied to the face 24 to which the tightening force is applied while the signals generated by the first circuit 41, the second circuit 42 and the third circuit 43 are measured so as to determine parameters a1, b1, c1, a2, b2, c2, a3, b3, c3, d1, d2, d3 making it possible to estimate the value of the forces applied against the face 24 of the sensor and the offsetting of these forces with respect to the center of the opening 22 of the ring 21 of the sensor 1.

The scalar voltage parameters a1, b1, c1, a2, b2, c2, a3, b3, c3, d1, d2, d3 are determined so as to resolve the following system of equations:

$$\begin{cases} S1 = a1 \cdot F + b1 \cdot F \cdot y + c1 \cdot F \cdot z \\ S2 = a2 \cdot F + b2 \cdot F \cdot y + c2 \cdot F \cdot z \\ S3 = a3 \cdot F + b3 \cdot F \cdot y + c3 \cdot F \cdot z \end{cases} \quad (1)$$

Then, after determination of these scalar voltage parameters a1, b1, c1, a2, b2, c2, a3, b3, c3, it is possible to determine an equation of the form:

$$F = A \cdot S1 + B \cdot S2 + C \cdot S3 \quad (2)$$

In which other parameters A, B and C are determined as a function of the previously determined scalar voltage parameters a1, b1, c1, a2, b2, c2, a3, b3, c3, d1, d2, d3.

This equation (2) then makes it possible to directly determine the precise intensity of a tightening force while taking account of the distancing of the point of application of this tightening force with respect to the main tightening axis as a function of the parameters a1, b1, c1, a2, b2, c2, a3, b3, c3, d1, d2, d3 and of the voltages S1, S2, S3 respectively measured by the first 41, second 42 and third 43 circuits.

Next, when a tightening force to be measured is applied against the ring 21, there is implemented a step of measuring the applied tightening force as a function of the voltage S1, S2, S3 measurement signals generated by the three circuits 41, 42, 43 and of the other parameters A, B and C determined during the calibration step.

Here, the measurement step employs a step of resolving equation (2) to determine the value of the intensity of the tightening force applied.

Thus, once these other parameters A, B and C have been determined, it is possible, as a function of the voltages S1, S2, S3 respectively of the first 41, second 42 and third 43 circuits, to determine the intensity of a tightening force applied to the ring 21 while taking account of the distancing of the point of application of this force with respect to the axis X in which the tightening direction extends. In other words, the method according to the invention makes it possible to determine the separation of the point of application of the tightening force with respect to the main tightening axis, with the result that it is then possible to finely determine the intensity of the tightening force.

In a second embodiment (not shown), the support strip of the electronic device is not installed on a planar face of the ring. It is directly fastened to the circumference of the ring, which is made possible by the use of a support strip material which is either flexible or preformed with a radius of curvature value corresponding to the external radius of the ring. In this embodiment, a person skilled in the art will rearrange the strain gauges in a manner which is no longer longitudinal, as for the main embodiment, but axial with respect to the axis of the opening of the ring of the sensor.

The invention claimed is:

1. A sensor for measuring a tightening force applied to a screw-assembly member, the sensor comprising:
   a ring having at least two faces axially opposite one another and a planar surface oriented perpendicular to the two opposite faces;
   an electronic device comprising a longitudinal support strip having two opposite ends, the support strip being installed on the planar surface;
   the electronic device comprising three circuits mounted on the longitudinal support strip, the three circuits comprising:
   a first circuit configured to generate a signal representative of a tightening force applied in a tightening direction to one of the two opposite faces;
   a second circuit configured to generate a signal representative of the distance of the applied force with respect to a center of the ring in a first direction perpendicular to the tightening direction; and
   a third circuit configured to generate another signal representative of the distance of the applied force with respect to the center of the ring in a second direction perpendicular to the tightening direction.

2. The measuring sensor as claimed in claim 1, in which the first circuit comprises a full-bridge assembly of strain gauges.

3. The measuring sensor as claimed in claim 2, in which the full-bridge assembly comprises two strain gauges, each of the two strain gauges installed on a respective opposite end of the support strip, and two additional gauges each installed in the vicinity of a center of the support strip and spaced from the center such that each one of the additional gauges is symmetrical to the other with respect to the center of the support strip.

4. The measuring sensor as claimed in claim 1, further comprising each the second circuit and the third circuit comprises a half-bridge assembly of respective strain gauges of the second circuit and of the third circuit.

5. The measuring sensor as claimed in claim 4, further comprising the half-bridge assembly of gauges of the second circuit comprises a first gauge of the second circuit installed on an end of the support strip and a second gauge of the second circuit installed in a vicinity of a center of the support strip and distant from the center of the support strip in the tightening direction.

6. The measuring sensor as claimed in claim 5, further comprising the second gauge of the second circuit is distant from the center of the support strip in the main tightening direction such that the second gauge of the second circuit is distant from the center in the direction of the face to which the tightening force is applied.

7. The measuring sensor as claimed in claim 4, further comprising the half-bridge assembly of gauges of the third circuit comprises a first gauge of the third circuit installed on an end of the support strip and a second gauge of the third circuit installed in a vicinity of the center of the support strip and distant from the center of the support strip in a first direction perpendicular to the tightening direction.

8. The measuring sensor as claimed in claim 6, further comprising the half-bridge assembly of gauges of the third circuit comprises a first gauge of the third circuit installed on an end of the support strip and a second gauge of the third circuit installed in a vicinity of the center of the support strip and distant from the center of the support strip in a first direction perpendicular to the tightening direction; and the first gauge of the half-bridge assembly of gauges of the second circuit is installed on an opposite edge to the first gauge of the half-bridge assembly of gauges of the third circuit.

9. The measuring sensor as claimed in claim 1, wherein the first direction corresponds to a longitudinal direction of the support strip.

10. The measuring sensor as claimed in claim 1, wherein the second direction extends along an axis forming an ortho-normal base with an axis in which the first direction extends and also with an axis in which the tightening direction extends.

11. A method for measuring a tightening force applied against a face of a measuring sensor, wherein the measuring sensor is as claimed in claim 1, the method further comprising:

tightening of a screw-assembly member;

during the tightening, calibrating by successively applying a plurality of forces to at least one of the two faces of the sensor; and during the successive application of a plurality of forces, generating signals by the first circuit, the second circuit and the third circuit and measuring the generated signals to determine scalar voltage parameters ($a_1$, $b_1$, $c_1$, $a_2$, $b_2$, $c_2$, $a_3$, $b_3$, $c_3$, $d_1$, $d_2$, $d_3$) making it possible to estimate the value of the forces applied against the one face of the sensor and the distance of the forces with respect to the center of the opening of the sensor; and measuring the applied tightening force as a function of the signals generated by the three circuits and of the scalar voltage parameters ($a_1$, $b_1$, $c_1$, $a_2$, $b_2$, $c_2$, $a_3$, $b_3$, $c_3$, $d_1$, $d_2$, $d_3$) determined during the calibration step.

* * * * *